(12) United States Patent
Kawan

(10) Patent No.: US 8,346,663 B2
(45) Date of Patent: Jan. 1, 2013

(54) METHOD AND SYSTEM OF CONTACTLESS INTERFACING FOR SMART CARD BANKING

(75) Inventor: Joseph C. Kawan, Hollywood, CA (US)

(73) Assignee: Citicorp Development Center, Inc., Blue Ash, OH (US)

( * ) Notice: Subject to any disclaimer, the term of this patent is extended or adjusted under 35 U.S.C. 154(b) by 1172 days.

(21) Appl. No.: 09/238,995

(22) Filed: Jan. 28, 1999

(65) Prior Publication Data

US 2002/0062284 A1   May 23, 2002

Related U.S. Application Data

(60) Provisional application No. 60/073,091, filed on Jan. 30, 1998.

(51) Int. Cl.
 *G06Q 40/00* (2012.01)
(52) U.S. Cl. ........... 705/41; 235/379; 209/534; 341/176
(58) Field of Classification Search .................... 705/41; 235/379; 209/534; 341/176
See application file for complete search history.

(56) References Cited

U.S. PATENT DOCUMENTS

| | | | | |
|---|---|---|---|---|
| 4,454,414 A | * | 6/1984 | Benton | 705/41 |
| 4,582,985 A | | 4/1986 | Lofberg | 235/380 |
| 5,221,838 A | * | 6/1993 | Gutman et al. | 235/379 |
| 5,461,217 A | * | 10/1995 | Claus | 235/380 |
| 5,563,393 A | * | 10/1996 | Coutts | 235/379 |
| 5,585,617 A | * | 12/1996 | Ohbuchi et al. | 235/491 |
| 5,590,038 A | * | 12/1996 | Pitroda | 705/41 |
| 5,603,078 A | * | 2/1997 | Henderson et al. | 725/6 |
| 5,748,737 A | * | 5/1998 | Daggar | 705/41 |
| 5,789,733 A | * | 8/1998 | Jachimowicz et al. | 235/492 |
| 5,831,547 A | * | 11/1998 | Ohtsuki et al. | 340/825.54 |
| 5,883,810 A | * | 3/1999 | Franklin et al. | 364/479.02 |
| 5,929,414 A | * | 7/1999 | Saitoh | 235/380 |
| 5,943,624 A | * | 8/1999 | Fox et al. | 455/556 |

FOREIGN PATENT DOCUMENTS

| | | |
|---|---|---|
| WO | WO 95/35546 | 12/1995 |
| WO | WO 97/45814 | 12/1997 |
| WO | WO 98/01905 | 1/1998 |
| WO | WO 98/25371 | 6/1998 |

OTHER PUBLICATIONS

European Search Report for Application No. EP 99 10 1544, 5 pp., dated Sep. 17, 2003.

\* cited by examiner

*Primary Examiner* — Daniel Felten
(74) *Attorney, Agent, or Firm* — Eric L. Sophir; SNR Denton US LLP

(57) ABSTRACT

A method and system of smart card banking utilizes a contactless communication interface, such as infrared or a wireless or radio frequency interface, including, for example, a proximity interface. A contactless communication is initiated for a smart card user between a smart card application and the on-line system of a financial institution, such as a bank, the system verifies authorization for the communication, the information is communicated for the user to the on-line system. The contactless communication is initiated, and the information is communicated, for example, between a contactless interface transceiver of a personal data assistant, into which the smart card is inserted, and the contactless interface transceiver of an on-line terminal. Alternatively, the contactless communication is initiated, and the information is communicated between a contactless interface transceiver of the smart card and the contactless interface transceiver of the terminal.

26 Claims, 10 Drawing Sheets

METHOD AND SYSTEM OF CONTACTLESS INTERFACING FOR SMART CARD BANKING

CROSS-REFERENCE TO RELATED APPLICATIONS

This application claims the benefit of U.S. Provisional Application No. 60/073,091 filed Jan. 30, 1998.

FIELD OF THE INVENTION

The present invention relates generally to the field of smart cards, and more particularly to a method and system of smart card banking using a contactless interface between the smart card and a financial institution banking system.

BACKGROUND

The use of smart card technology in the consumer environment places a high physical demand on the devices. In order to be considered practical, they must be able to withstand significant wear and tear. The current use of devices with, for example, metallic contacts for the interface, involves significant physical limitations, such as cables and connections, and such devices are especially susceptible to physical wear and tear. Thus, there is a need for a method and system of smart card banking, which utilizes a contactless interface to establish a communications link between the smart card and the banking institution, and which minimizes wear and tear on the interfacing devices and maximizes durability of such devices.

SUMMARY OF THE INVENTION

It is a feature and advantage of the present invention to provide a method and system of smart card banking utilizing a contactless interface to establish a communications link for bidirectional flow of data between the smart card and a banking institution, which provides all the benefits of contact interface without the physical limitations of the contacts and without any significant increase in cost.

It is a further feature and advantage of the present invention to provide a method and system of smart card banking using a contactless communications interface to increase durability.

It is an additional feature and advantage of the present invention to provide a method and system of smart card banking utilizing a contactless interface to improve ease-of-use and to eliminate the need, for example, for cables and connections.

To achieve the stated and other features, advantages and objects of the present invention, an embodiment of the invention provides a method and system of smart card banking utilizing a contactless interface. According to an embodiment of the invention, a contactless communication is initiated for a smart card user between a smart card application residing, for example, on a smart card microcomputer and the on-line system, for example, of a financial institution, such as a bank. The system verifies authorization for the communication, and once the authorization is verified, information can be communicated for the user to the on-line system. The contactless communication is initiated by initiating a contactless communication interface, such as an infrared communication interface or a wireless or radio frequency communication interface, including, for example, a proximity communication interface.

In an embodiment of the present invention, the contactless communication is initiated, for example, at a terminal, such as an automated teller machine, a personal computer, or a land or wireless telephone, through a contactless communication transceiver of the terminal, such as an infrared transceiver or a wireless or radio frequency transceiver, including, for example, a proximity transceiver. The contactless communication is initiated between the contactless communication transceiver of the terminal and a contactless communication transceiver of a personal data assistant, such as an electronic purse or wallet. Further, the process of initiating the contactless communication also involves, for example, initiating a physical contact communication between the smart card imbedded with a smart card microcomputer, on which the smart card application resides, and the personal data assistant, such as the electronic purse or wallet, which includes a card reader. In an alternate embodiment of the present invention, the smart card is provided with a contactless communication interface transceiver, such as an infrared transceiver or a wireless or radio frequency transceiver, including, for example, a proximity transceiver, and the contactless communication is initiated directly between the smart card contactless communication interface transceiver and the contactless communication interface transceiver of the terminal.

In an embodiment of the present invention, the authorization for the communication is verified, for example, by one or both of the personal data assistant, such as the electronic purse, and the on-line terminal, such as the automated teller machine, the personal computer, or the telephone. The authorization verification involves, for example, verifying the authenticity of the smart card and checking security information for the user, such as the user's PIN number or biometric information, such as the user's fingerprint. The security information is received by the system through an input/output device of the personal data assistant or the terminal. Once the authorization is verified, information can then be communicated for the user to the on-line system, likewise by inputting the information through the input/output device of the personal data assistant or the terminal.

Additional objects, advantages and novel features of the invention will be set forth in part in the description which follows, and in part become more apparent to those skilled in the art upon examination of the following or may be learned by practice of the invention.

DETAILED DESCRIPTION OF THE INVENTION

Figure 1:
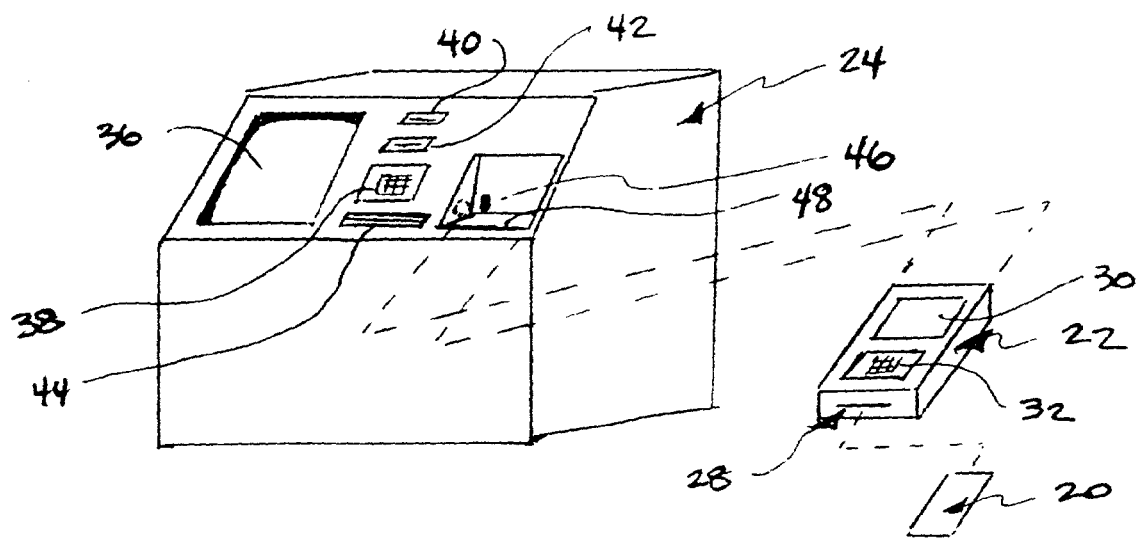
FIG. 1 depicts samples of key hardware components for an embodiment of the present invention.

Referring now in detail to an embodiment of the present invention, an example of which is illustrated in the accompanying drawings, FIG. 1 illustrates samples of hardware components for an embodiment of the present invention. The hardware components include, for example, a smart card 20 in the form of a credit card-sized plastic card with a microcomputer having memory to set up and securely store data. A personal data assistant (PDA) 22 provides a physical interface with smart card 20 in order to exchange information and perform transactions. Personal data assistant 22 is, for example, an electronic purse or wallet, or any other alphanumeric input/output and display device able to provide a conduit between smart card 20 and a financial institution, such as through an automated teller machine (ATM) 24. Automated teller machine 24 is, for example, a device capable of verifying and authorizing smart card 20 and performing financial institution and other similar data exchange transactions.

Figure 2:
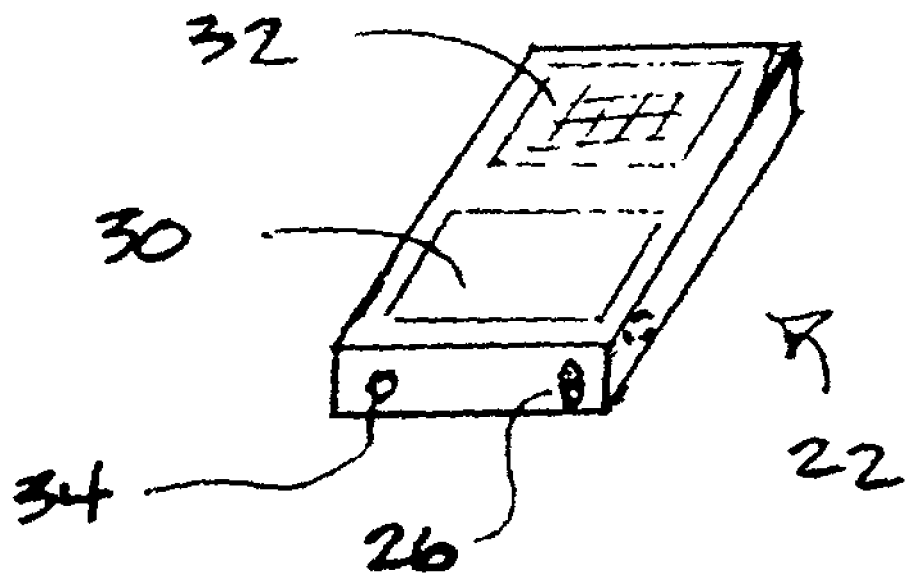
FIG. 2 depicts and provides further detail regarding the personal data assistant hardware component for an embodiment of the present invention.

FIG. 2 provides further detail regarding the personal data assistant hardware component for an embodiment of the present invention. Personal data assistant 22 includes, for example, a contactless communications interface 26 for input and output of data, such as an infrared (IR) emitter and sensor. The IR interface enables fast data transfer rates, such as 100 kilobits/second, while providing a large emitter target area that allows for some misalignment between the communicating devices, such as personal data assistant 22 and automated teller machine 24. While the example embodiment depicted in the drawings utilizes an IR interface, it will be appreciated that other contactless interfaces, such as wireless technologies or proximity-type technologies, can likewise be successfully utilized for an embodiment of the present invention. Additionally, the personal data assistant 22 may also be provided, for example, with ports 34 for direct communications links, such as by connecting wires or cables between devices. This redundant communications capability advantageously increases the utility of the personal data assistant 22, so that it can interact, for example, with more data transfer devices.

In an embodiment of the present invention, personal data assistant 22 also includes a smart card reader 28 communicating with smart card 20. Smart card 20 is inserted into smart card reader 28 of personal data assistant 22, which verifies the smart card. The verification process involves, for example, checking security information, such as a personal identification number (PIN) or biometric information of the user of the smart card 20. Personal data assistant 22 is also provided with a display 30 and an alphanumeric keypad 32, or other similar input/output means, for viewing, inputting, and manipulating this information and other data.

In an embodiment of the present invention, personal data assistant 22 performs transactions with the smart card 20 and has memory in which it is capable of storing various information and programs. Depending on the configuration of the personal data assistant 22, the memory capacity can be, for example, 16 megabytes or more. Further, the personal data assistant 22 is enabled, for example, by its own power source, such as a battery. Alternative power source configurations for the personal data assistant 22 include, for example, direct connections to external power supplies or contactless connections, such as with magnetic field-induced voltage.

In an embodiment of the present invention, personal data assistant 22 communicates with automated teller machine 24 through the contactless communications interface 26. Automated teller machine 24 includes, for example, a display 36, an alphanumeric keypad 38 or other similar input/output means, a printer with printer output 40, a card reader 42, and a money dispenser 44. The personal data assistant 22 is aligned with contactless communications interface 46 on automated teller machine 24, for example, by placing the personal data assistant on a ledge or shelf 48. Shelf 48, or other equivalent structure, is configured such that it guides the contactless communications interface 26 on personal data assistant 22 into substantial alignment with the contactless communications interface 46 on automated teller machine 24. While in the embodiment example depicted in the drawings, interface 46 utilizes IR interface contactless communications technology with an IR emitter and sensor, it will be appreciated that other contactless interfaces, such as wireless technologies or proximity-type technologies, can likewise be successfully used for an embodiment of the present invention.

Figure 3:
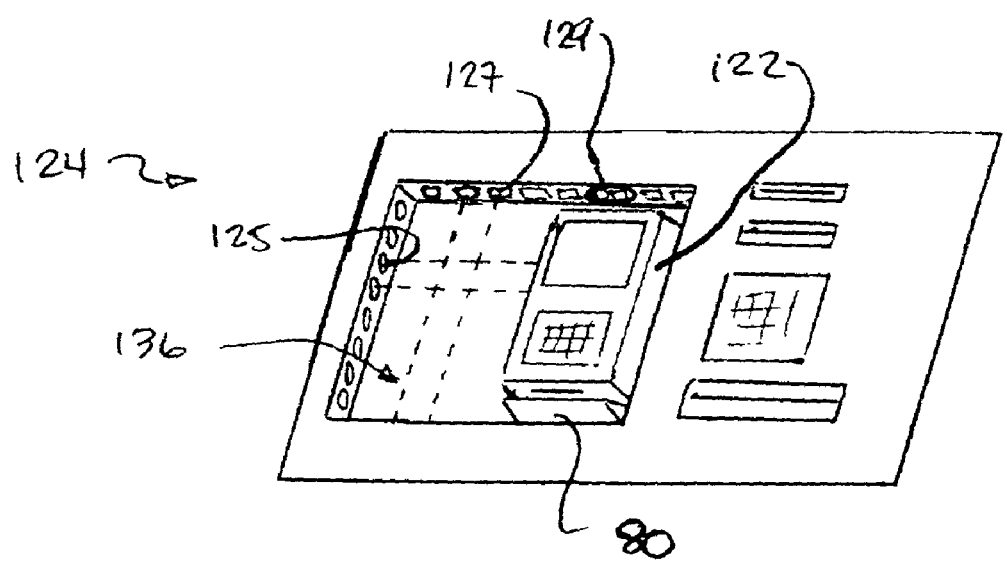
FIGS. 3-4 illustrate key hardware components for an alternate embodiment of the present invention.
Figure 4:
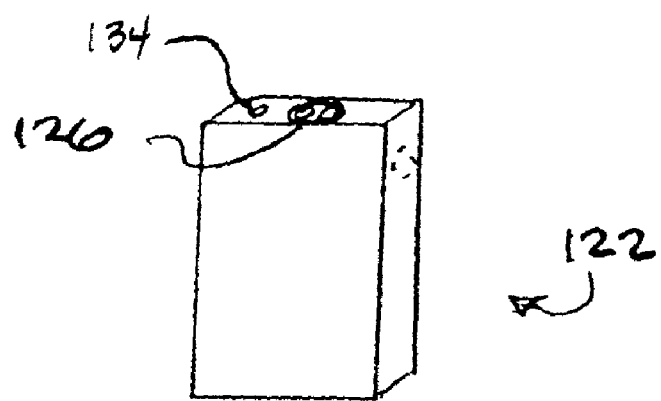

FIGS. 3-4 illustrate key hardware components for an alternate embodiment of the present invention. In an alternate embodiment of the invention, the hardware components include a personal data assistant 122 placed directly on display or IR touch screen 136 of automated teller machine 124. In this embodiment, personal data assistant 122 includes contactless communications interface 126 disposed on the end of the personal data assistant. It will be appreciated by those skilled in the art that other placements of interface 126, such as on a side of personal data assistant 122, are equally feasible. Further, the personal data assistant 122 includes a port 134 for direct communications links, such as by connecting wires or cables between devices.

In an embodiment of the present invention, IR touch screen 136 includes sets of IR emitters 125 on one side that correspond to sets of IR sensors 127 on the opposite side. This arrangement of emitters 125 and sensors 127 essentially divides display 136 into a grid, wherein a position on the grid may be determined by the intersection of perpendicular pairs of emitters and sensors, as illustrated by the dotted lines in FIG. 3. Thus, for a successful communication to occur, a proper alignment of personal data assistant 122 within the grid framework is required.

Referring to FIG. 3 for an embodiment of the present invention, display 136 further includes a custom touch screen having a set IR emitter/sensor pair 129 in substantial alignment for communication with communications interface 126 on the end of personal data assistant 122 with the proper positioning of the personal data assistant. There are numerous ways to insure proper positioning of personal data assistant 122, such as by providing markings on the surface of display 136, markings on the face of automated teller machine 124 adjacent display 136, and by providing built-in structure on the face of automated teller machine 124 to limit the positioning of personal data assistant 122. For example, if the touch screen is not oriented horizontally or at a low angle, then support 80 may be required to hold personal data assistant 122 in position on the touch screen. Other configurations will be obvious to those skilled in the art. In this manner, communications interface 126 on personal data assistant 22 interacts directly with emitter/sensor pair 129 of display 136.

Figure 5:
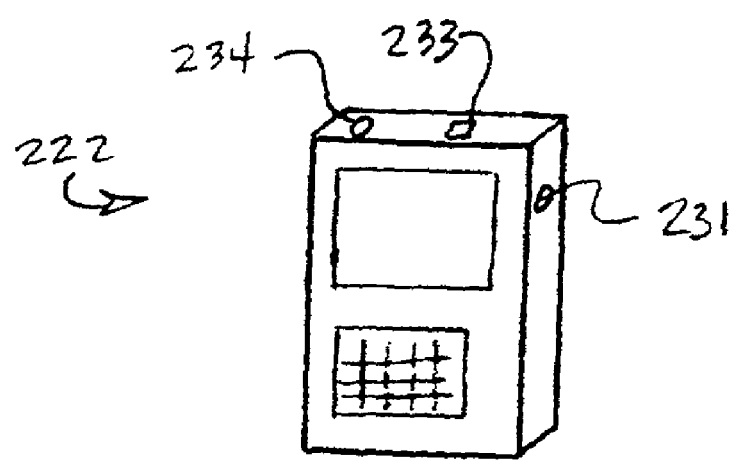
FIGS. 5-6 illustrate key hardware components for another alternate embodiment of the present invention.
Figure 6:
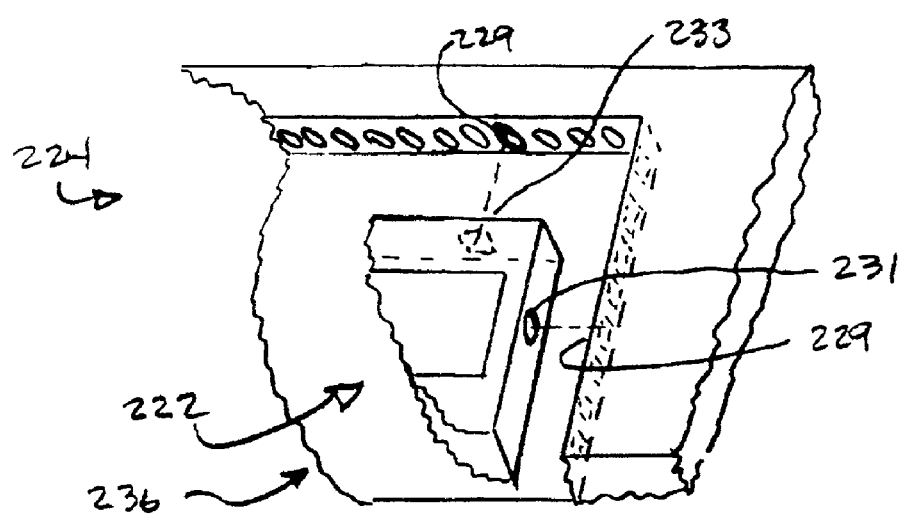

FIGS. 5-6 illustrate key hardware components for another alternate embodiment of the present invention. For example, in such alternate embodiment of the present invention, personal data assistant 222 includes a single IR emitter 231 on one side and a single IR sensor 233 on an adjacent side. Further, personal data assistant 222 includes port 234 for direct communications links, such as by connecting wires or cables between devices. When personal data assistant 222 is placed on IR touch screen or display 236 of automated teller machine 224, single emitter 231 substantially aligns with a corresponding sensor 229 and, similarly, sensor 233 is in substantial alignment with corresponding emitter 229. Thus, personal data assistant 222 is able to communicate with automated teller machine 224.

Figure 7:
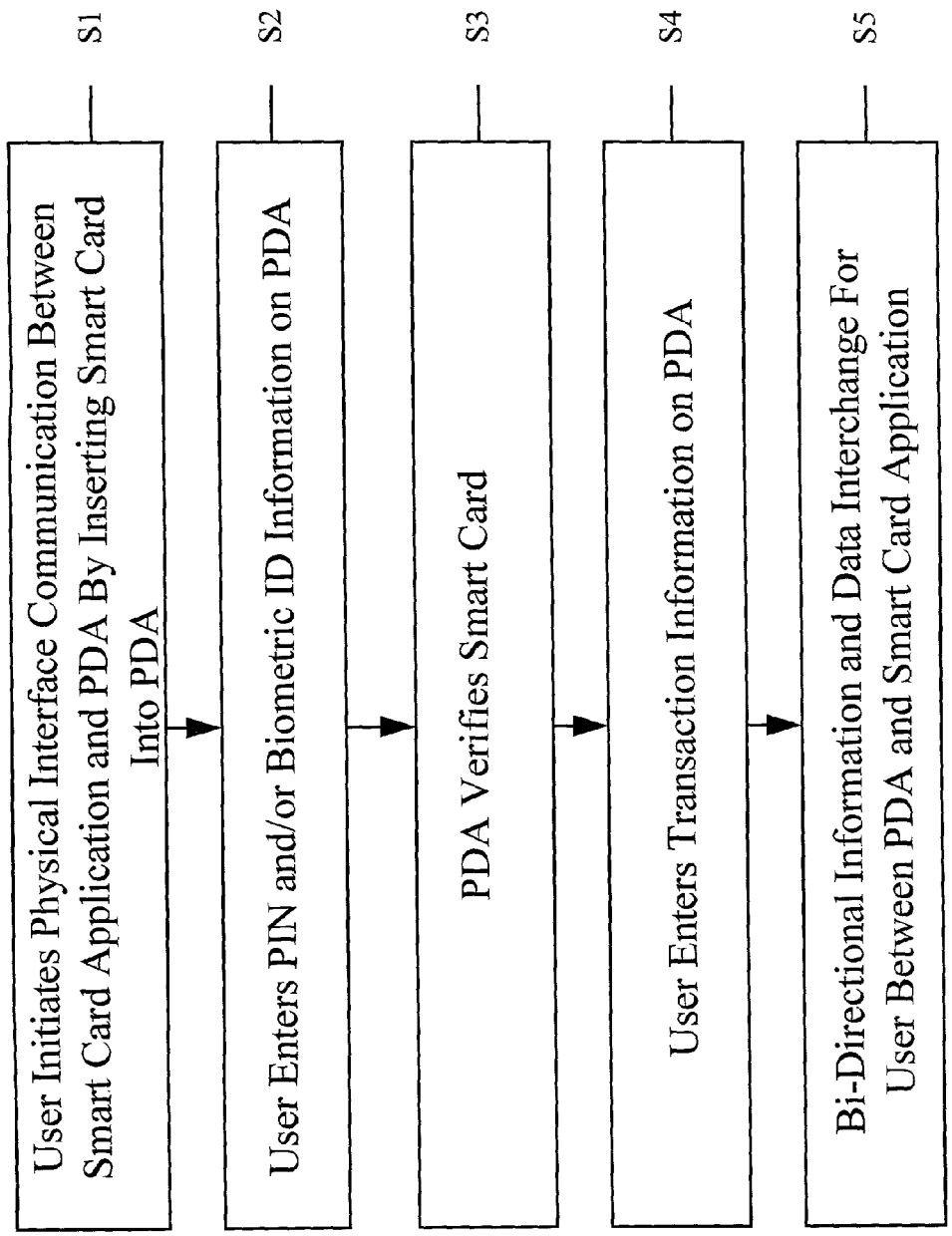
FIG. 7 is a schematic flow chart which illustrates an example of the process of loading a smart card into a personal data assistant for an embodiment of the present invention.

FIG. 7 is a schematic flow chart with illustrates an example of the process of loading a smart card into a personal data assistant for an embodiment of the present invention. For example, at S1, a smart card 20 is inserted into a personal data assistant 22 or, for example, an electronic wallet or purse. At S2, personal data assistant 22, or the wallet or purse, performs a verification process. This process validates smart card 22 and involves security checks, which consist, for example, of the entering one or both of a secret PIN number and biometric information, such as finger prints for the user. Once smart card 20 is validated, then at S3, transactions between personal data assistant 22 and the smart card 20 may occur. Thus a user can control the transactions through input/output means, such as keypad 32, on the personal data assistant 22 and can view information on the display 30. The types of transactions that the user can perform include, for example, loading or unloading phone numbers and addresses, updating stocks, performing financial transactions and checking balances. Thus, information and data can be exchanged between the smart card 20 and the personal data assistant 22, and the information on the smart card can be viewed on the personal data assistant.

Figure 8:
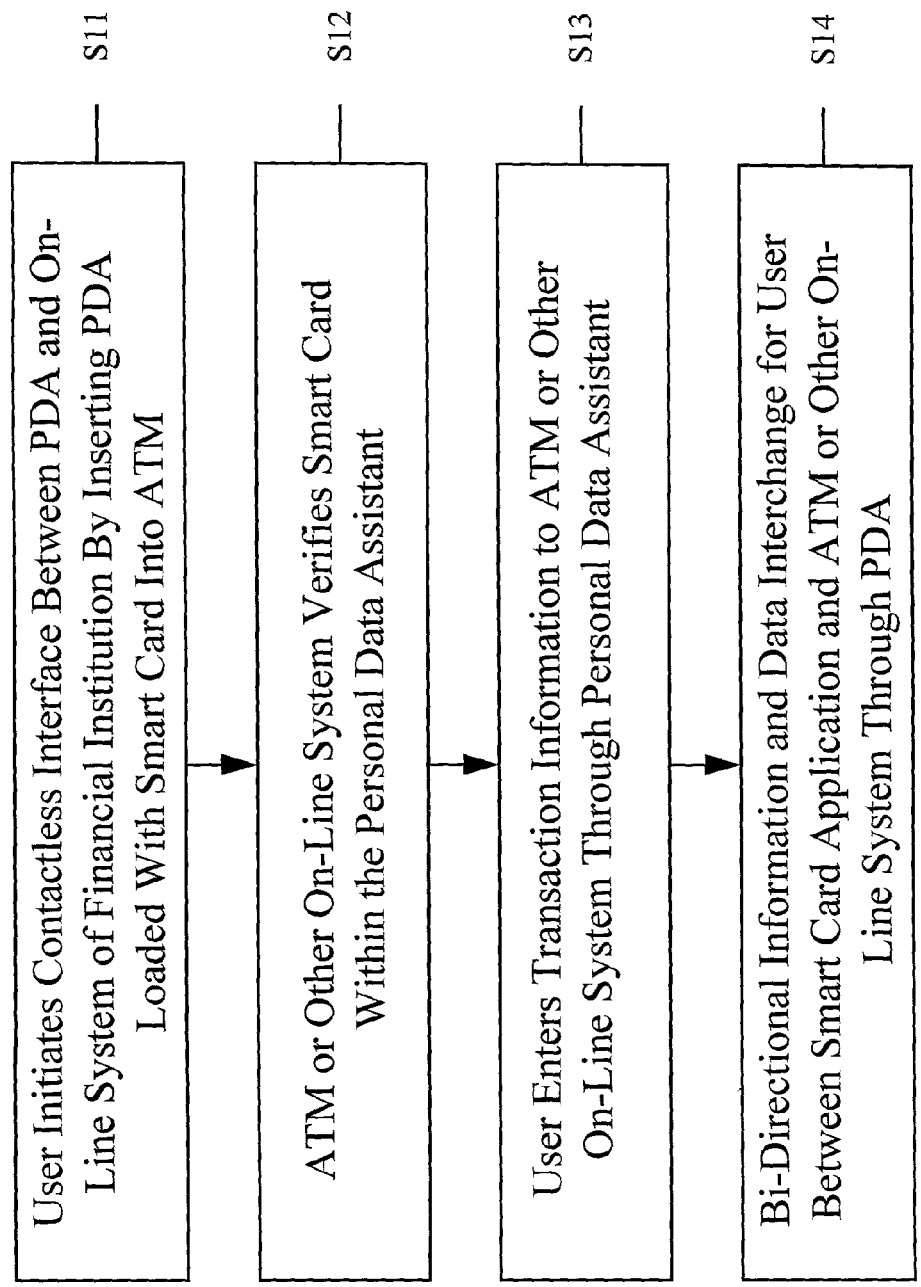
FIG. 8 is a schematic flow chart which illustrates an example of the process of a contactless interface transaction between the smart card loaded in the personal data assistant with the smart card loaded and an automated teller machine for an embodiment of the present invention.

FIG. 8 is a schematic flow chart which illustrates an example of a contactless transaction between the smart card loaded in the personal data assistant and an automated teller machine for an embodiment of the present invention. Once smart card 20 is loaded in personal data assistant 22, the personal data assistant loaded with the smart card can then be used to perform transactions with an on-line system, such as a financial institution. At S11, the IR capability of the personal data assistant enables a contactless communication interface to be established between the personal data assistant 22 and the on-line system. As shown in FIGS. 1, 3, and 6, this interface can include aligning the personal data assistant on the automated teller machine 24, 124, or 224 with a corresponding IR interface. Alternatively, the interface can consist of aligning the IR interface on the personal data assistant with a corresponding IR interface on a phone, cell phone, computer or other similar devices capable of performing transactions.

In an embodiment of the present invention, the contactless interface advantageously allows the user to quickly establish contact, for example, with automated teller machine 24, 124, or 224 without worrying about connecting cables or aligning the devices precisely. When the personal data assistant establishes communications with the automated teller machine, for example, an authorization and verification process begins. At S 12, the automated teller machine 24 or on-line system verifies the smart card 20 within the personal data assistant 22. The user may be required to input information, such as a PIN or biometric information. Upon completing the verification, the user can then perform transactions with the on-line system through the personal data assistant 22, at S13. For example, the user can have a pre-loaded program that skips the typical selection screens on the automated teller machine 24 and directly performs a specified transaction. At S14, such transactions may include, for example, loading value on the smart card 20, making investments, loading or unloading data such as addresses, phone numbers or stock information, and many other similar transactions.

In an embodiment of the present invention, it is to be recognized that an important feature of a smart card is the ability to authenticate the physical card. The smart card with account and/or security information is used in the opening of a transaction to identify the user's account and, through the authentication of encrypted security information, to verify that the particular card is authentic. In order to verify that it is the correct user that is submitting or using the smart card, the secret PIN number and/or biometric information is sent with the card during the start of a transaction. The secret PIN number and/or biometric information, such as the user's fingerprint, is always encrypted for external transmission. Alternatively, to provide a further level of security, the entered PIN number and/or biometric information can be used to unlock the smart card to enable the card to communicate its information. If the personal data assistant or other smart card-accepting device has the required security, both the secret PIN number and the biometric information, along with the card information, can be stored, for example, for a one-time use or for multiple uses, depending on the level of security required. This can occur, for example, on an automated teller machine or where a normal contact interface smart card would be slow to execute a transaction, such as a with a personal data assistant which has the contactless interface capability, for example, with a prepackaged transaction.

Figure 9:
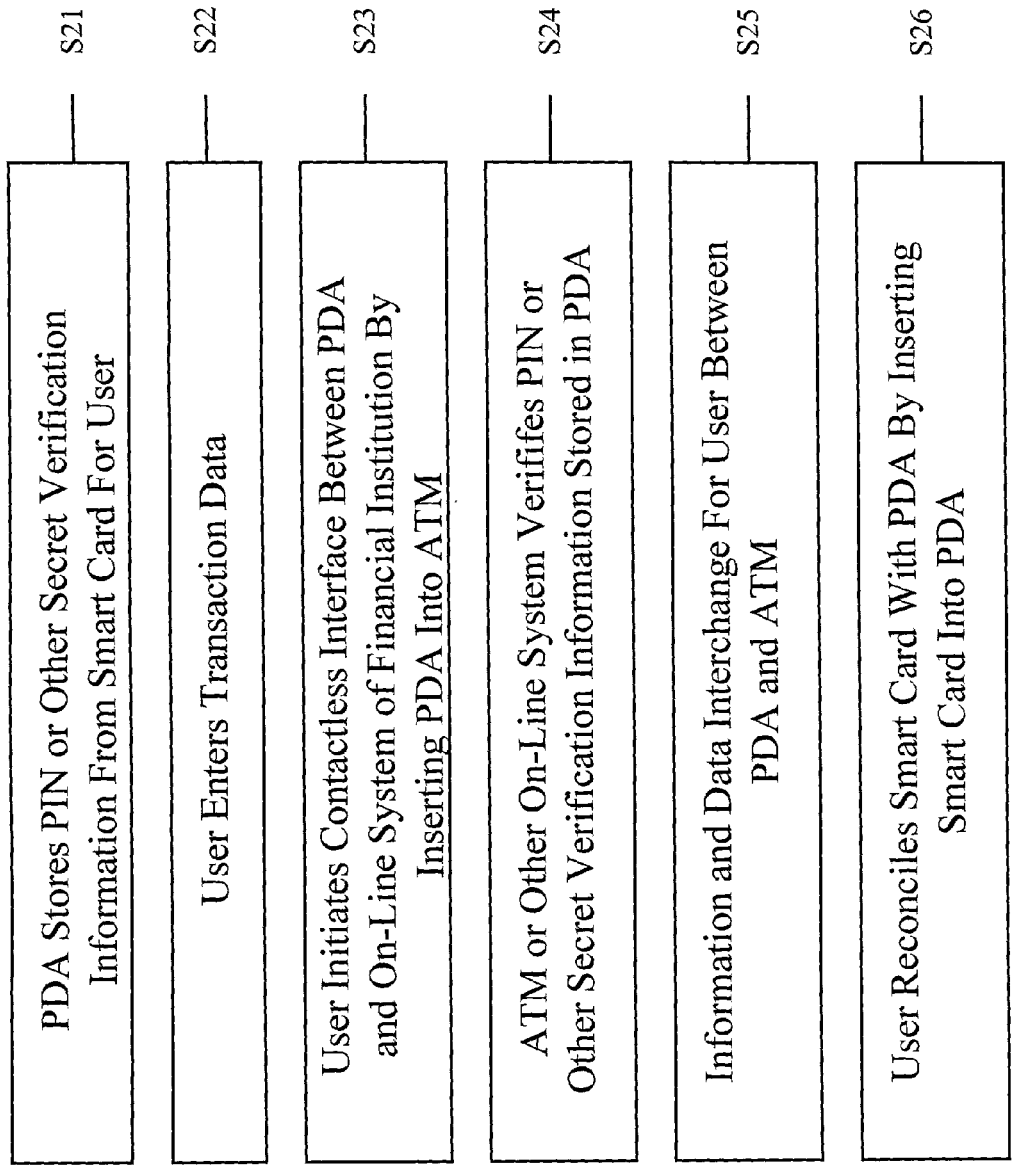
FIG. 9 is a schematic flow chart which illustrates an example of the process of a contactless interface transaction in which the personal data assistant communicates directly with the automated teller machine without the smart card for an embodiment of the present invention.

In an alternate embodiment of the present invention, the personal data assistant 22 may communicate directly, for example, with the automated teller machine 24 or financial institution without having the smart card 20 loaded in the personal data assistant. FIG. 9 is a schematic flow chart with illustrates an example of the process of a contactless transaction in which the personal data assistant communicates directly with an automated teller machine without the smart card. For example, at S21, the personal data assistant 22 stores the secret verification information that is contained on the smart card 20. This process requires a very high level of security for the personal data assistant 22, as a higher level of security is generally required for a smart card as opposed to a personal data assistant. In this case, the user can, for example, perform transactions separately, between the smart card 20 and the personal data assistant 22 and between the personal data assistant and the automated teller machine 24. For example, at S22, the user enters the transaction to the personal data assistant. At S23, the user initiates the contactless interface between the personal data assistant and the on-line system of the financial institution by inserting the personal data assistant into the automated teller machine. At S25, information and data are interchanged for the user between the personal data assistant and the automated teller machine. At S26, the transactions then need to be reconciled on the smart card 20 or the automated teller machine 24.

Figure 10:
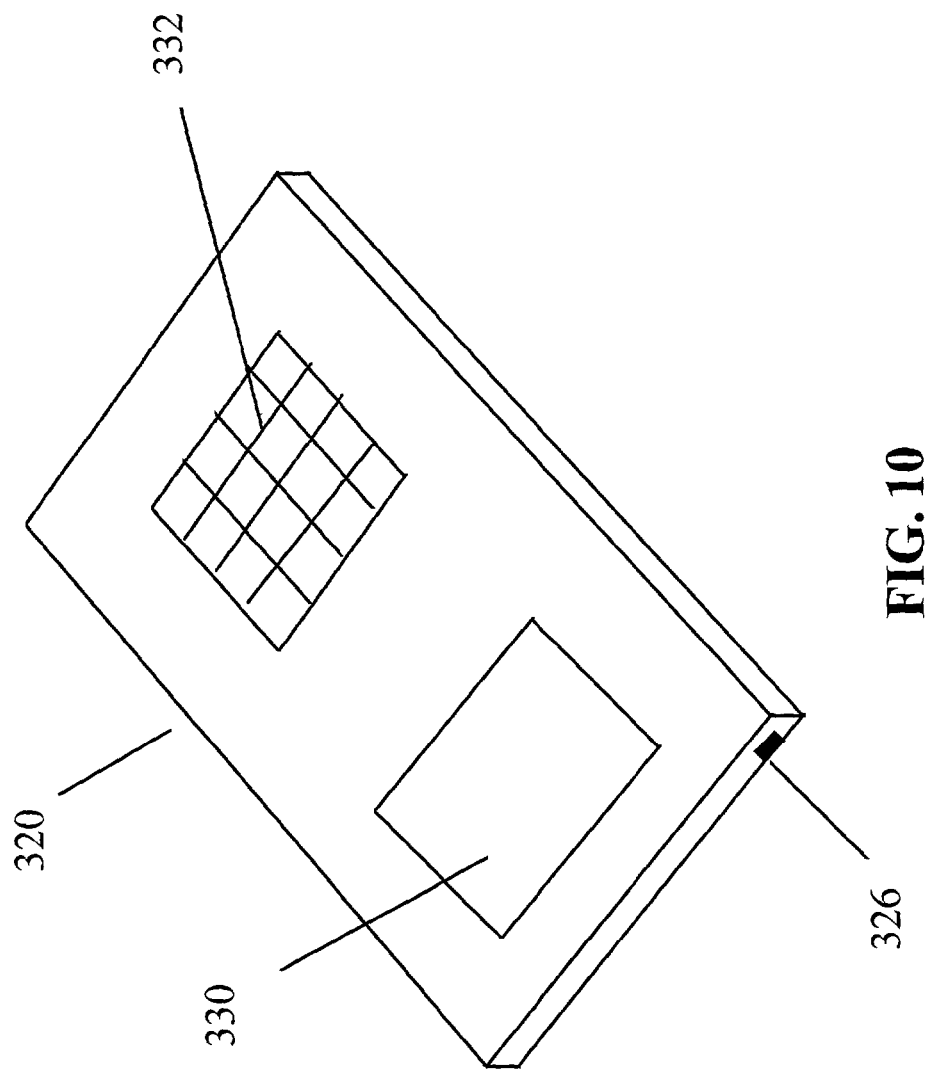
FIG. 10 shows a smart card hardware component for an additional alternate embodiment of the present invention.

FIG. 10 provides further detail regarding a smart card for an additional alternate embodiment of the present invention. In the additional alternate embodiment, the smart card 320 has, for example, an alphanumeric input/output keypad 332, a display 330, and an IR communications interface 326. Smart card 320 is also provided with sufficient memory to perform various financial transactions. Thus, in such an embodiment, the smart card 320 communicates directly with the financial institution through the IR interface 326, for example, through an automated teller machine, a phone, a cell phone, a computer, or other similar device with corresponding IR interface, and the user may view and manipulate the transactions.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method of contactless interfacing for a financial transaction smart card, comprising:
   allowing a user to establish a physical contact bi-directional communication interface between a financial transaction smart card and a hand-held computing device for accessing a financial transaction smart card application on a microcomputer of the financial transaction smart card;
   allowing the user to enter identifying information and transaction information on the hand-held computing device;
   allowing the user to initiate a contactless bi-directional infrared communication interface via an infrared emitter and sensor of the hand-held computing device as a conduit between the financial transaction smart card application on the microcomputer of the financial transaction smart card and an infrared emitter and sensor of a self-service transaction terminal of an on-line system of a financial institution, wherein allowing the user to initiate the contactless bi-directional communication interface further comprises guiding the hand-held computing device into a position of substantial alignment of the infrared emitter and sensor of the hand-held computing device with the infrared emitter and sensor of the self-service financial transaction terminal by a structure provided on a face of the self-service transaction terminal;
   verifying the financial transaction smart card by the on-line system based at least in part on the identifying information received by the on-line system via the contactless communication interface between the hand-held computing device and the self-service transaction terminal; and
   communicating the transaction information entered by the user on the hand-held computing device to the self-service transaction terminal of the on-line system via the contactless communication interface, wherein the self-service transaction terminal is programmed to present a sequence of selection screens for a transaction related to the transaction information entered by the user on the hand-held computing device, wherein the hand-held computing device is programmed to skip the presentation of at least some of the selection screens of the sequence, and wherein communicating the transaction information further comprises skipping the presentation of said at least some of the selection screens of the sequence by the hand-held computing device according to said program.

2. The method of claim 1, wherein the financial institution further comprises a bank.

3. The method of claim 1, wherein the self-service transaction terminal further comprises a telephone.

4. The method of claim 3, wherein the self-service transaction terminal further comprises a wireless telephone.

5. The method of claim 1, wherein verifying the financial transaction smart card further comprises verifying the financial transaction smart card by the on-line system based at least in part on the identifying information received by the on-line system via the contactless communication interface between the hand-held computing device comprising a personal data assistant and the self-service transaction terminal.

6. The method of claim 1, wherein verifying the financial transaction smart card further comprises verifying the authenticity of the financial transaction smart card.

7. The method of claim 1, wherein verifying the financial transaction smart card further comprises checking security information for the user.

8. The method of claim 7, wherein checking security information further comprises receiving security information for the user.

9. The method of claim 8, wherein receiving security information further comprises receiving a PIN number for the user.

10. The method of claim 8, wherein receiving security information further comprises receiving biometric information for the user.

11. The method of claim 8, wherein receiving security information further comprises receiving the security information on an input/output device.

12. The method of claim 11, wherein receiving the security information further comprises receiving the security information through an input/output device of the hand-held computing device comprising a personal data assistant.

13. The method of claim 12, wherein the personal data assistant comprises an electronic purse or wallet.

14. The method of claim 11, wherein receiving the security information further comprises receiving the information through the input/output device of a terminal.

15. The method of claim 1, wherein allowing the user to enter the transaction information further comprises receiving the information through an input/output device.

16. The method of claim 15, wherein receiving the information further comprises receiving the information through the input/output device of the hand-held computing device comprising a personal data assistant.

17. The method of claim 16, wherein the personal data assistant comprises an electronic purse or wallet.

18. The method of claim 15, wherein receiving the information further comprises receiving the information through the input/output device of a terminal.

19. A contactless interface system for a financial transaction smart card, comprising:
   a self-service transaction terminal of an on-line system of a financial institution;
   a hand-held computing device capable of establishing a physical contact bi-directional communication interface with the financial transaction smart card for accessing a financial transaction smart card application on a microcomputer of the financial transaction smart card;
   wherein the hand-held computing device has an input device for receiving identifying information and transaction information entered by a user;
   wherein the hand-held computing device is capable of initiating a contactless bi-directional communication interface as a conduit between the financial transaction smart card application on the microcomputer of the financial transaction smart card and the self-service transaction terminal of the on-line system via an infrared emitter and sensor of the hand-held computing device and an infrared emitter and sensor of the self-service transaction terminal, and wherein a structure is provided on a face of the self-service transaction terminal for guiding the hand-held computing device into a position of substantial alignment of the infrared emitter and sensor of the hand-held computing device with the infrared emitter and sensor of the self-service transaction terminal;
   wherein the on-line system is capable of verifying the financial transaction smart card via identification information received by the on-line system via the contactless communication interface between the hand-held computing device and the self-service transaction terminal; and wherein the hand-held computing device is capable of communicating the transaction information to the on-line system via the contactless communication interface between the hand-held computing device and the self-service transaction terminal, wherein the self-service transaction terminal is programmed to present a sequence of selection screens for a transaction related to the transaction information entered by the user on the hand-held computing device, and wherein the hand-held computing device is programmed to skip the presentation of at least some of the selection screens of the sequence.

20. The system of claim 19, wherein the self-service transaction terminal comprises a telephone.

21. The system of claim 19, wherein the on-line system comprises a bank host on-line system.

22. The system of claim 19, wherein the hand-held computing device comprises a personal data assistant.

23. The system of claim 22, wherein the personal data assistant comprises an electronic purse or wallet.

24. The method of claim 1, wherein the accessing of the financial transaction smart card application comprises executing the financial transaction smart card application.

25. The method of claim 1, wherein the accessing of the financial transaction smart card application comprises loading the financial transaction smart card application.

26. The method of claim 25, further comprising iteratively performing:
the initiating of a contactless communication;
the verifying authorization; and
the communicating information.

* * * * *